(12) United States Patent
Berkemeier

(10) Patent No.: US 10,732,637 B2
(45) Date of Patent: Aug. 4, 2020

(54) APPARATUS AND METHOD FOR CONTROLLING A VEHICLE

(71) Applicant: Autonomous Solutions, Inc., Petersboro, UT (US)

(72) Inventor: Matthew D. Berkemeier, Beverly Hills, MI (US)

(73) Assignee: Autonomous Solutions Inc., Petersboro, UT (US)

(*) Notice: Subject to any disclaimer, the term of this patent is extended or adjusted under 35 U.S.C. 154(b) by 0 days.

(21) Appl. No.: 16/148,762

(22) Filed: Oct. 1, 2018

(65) Prior Publication Data

US 2019/0033874 A1   Jan. 31, 2019

Related U.S. Application Data

(63) Continuation of application No. 15/138,069, filed on Apr. 25, 2016, now Pat. No. 10,139,826.

(60) Provisional application No. 62/152,218, filed on Apr. 24, 2015.

(51) Int. Cl.
   *G05D 1/02* (2020.01)
   *A01B 69/04* (2006.01)

(52) U.S. Cl.
   CPC .......... *G05D 1/0212* (2013.01); *A01B 69/008* (2013.01); *G05D 2201/0201* (2013.01)

(58) Field of Classification Search
   None
   See application file for complete search history.

(56) References Cited

U.S. PATENT DOCUMENTS

| | | | |
|---|---|---|---|
| 5,375,059 A | 12/1994 | Kyrtsos et al. | |
| 5,610,815 A | 3/1997 | Gudat | |
| 5,648,901 A | 7/1997 | Gudat et al. | |
| 7,089,162 B2 | 8/2006 | Nagel | |
| 7,228,214 B2 * | 6/2007 | Flann | A01B 69/008 701/50 |
| 8,930,058 B1 | 1/2015 | Quist | |
| 2005/0027415 A1 | 2/2005 | Iwazaki | |
| 2006/0178825 A1 | 8/2006 | Eglington | |
| 2009/0265053 A1 | 10/2009 | Dix | |
| 2012/0185113 A1 | 7/2012 | Pampus et al. | |

(Continued)

FOREIGN PATENT DOCUMENTS

WO   2004031691   4/2004

OTHER PUBLICATIONS

Oshana et al., Software Engineering for Embedded Systems: Methods, Practical Techniques, and Applications, 2013 (2013).

(Continued)

*Primary Examiner* — Tamara L Weber

(57) ABSTRACT

A path controller for guiding an autonomous vehicle along a desired path may include an input module that may receive input signals such as, a normal error signal that indicates an off-path deviation of the autonomous vehicle relative to a desired path, a heading signal, and a curvature signal associated with the autonomous vehicle. The path controller may also include a curvature rate module that calculates a curvature rate output signal to guide the autonomous vehicle along the desired path and a communication module that communicates the curvature rate output signal to a steering control system.

17 Claims, 8 Drawing Sheets

(56) References Cited

U.S. PATENT DOCUMENTS

2013/0054128 A1* 2/2013 Moshchuk ............ G08G 1/167
 701/301
2015/0346728 A1 12/2015 Peake
2016/0052546 A1 2/2016 Arakane

OTHER PUBLICATIONS

S.M. LaValle, Planning Algorithms, Cambridge University Press, (2006).
Luca et al., Feedback control of a nonholonomic car-like robot, in Robot Motion Planning and Control, ser. Lecture Notes in Control and Information Sciences, J.-P. Laumond et al.:Springer, 1998, vol. 229, pp. 171-253.
Fraichard et al., From Reeds and Shepp's to Continuous-Curvature Paths, IEEE Transactions on Robotics and Automation, vol. 20, No. 6, (Dec. 2004).
M.D. Berkemeier, Optimal, stable switching between arcs during low-speed Ackerman path tracking, in Proceedings of the 2013 American Control Conference (2013).
M.D. Berkemeier, Optimal, stable switching between arcs during low-speed Ackerman path tracking with rare-limited steering, in Proceedings of the 52nd IEEE Conference on Decision and Control (2013).
Murray et al., Nonholonomic Motion Planning: Steering using Sinusoids, IEEE Transactions on Automatic Control, vol. 38, No. 5, pp. 700-716, (May 1993).
Samson, Control of chained systems, application to path following, and time-varying point-stabilization of mobile robots, IEEE Transactions on Automatic Control, vol. 40, No. 1, pp. 64-77 (Jan. 1995).
Hingwe et al., A variable look-ahead controller for lateral guidance of four wheeled vehicles, in Proceedings of the American Control Conference (1998).
Guldner et al., Study of design directions for lateral vehicle control, in Proceedings of the 36th Conference on Decision & Control (1997).
Patwardhan et al., A general framework for automatic steering control: system analysis, in Proceedings of the American Control Conference (1997).
Wit et al., Autonomous ground vehicle path tracking, Journal of Robotic Systems, vol. 21, No. 8 (2004).
Hellstro et al., Follow the past: a path tracking algorithm for autonomous vehicles, International Journal of Vehicle Autonomous Systems, vol. 4, No. 2-4 (2006).
Meek et al., Clothoid Spline Transition Spirals, Mathematics of Computation, vol. 59, No. 199, pp. 117-133 (Jul. 1992).
Kostov et al., Suboptimal paths in the problem of a planar motion with bounded derivative of the curvature, INRIA, Tech, Rep. 2051 (Jul. 1993).
Kostov et al., Some properties of Clothoids, INRIA, Tech. Rep. 2752 (Dec. 1995).
Kostova et al., Irregularity of optimal trajectories in a control problem fora car-like robot, INRIA, Tech. Rep. 3411, (Apr. 1998).
Kelly et al., Reactive nonholonomic trajectory generation via parametric optimal control, International Journal of Robotics Research, vol. 22, No. 7-8, pp. 583-601 (Jul.-Aug. 2003).
Lewis et al., Applied Optimal Control, Taylor & Francis (1975).
W.H. Press, Teukolsky et al., Numerical Recipes in C: the Art of Scientific Computing, 2nd ed. Cambridge (1992).

\* cited by examiner

APPARATUS AND METHOD FOR CONTROLLING A VEHICLE

CROSS-REFERENCE TO RELATED APPLICATIONS

The present application is a continuation of U.S. patent application Ser. No. 15/138,069 which was filed on Apr. 25, 2016, entitled "Apparatus and Method for Controlling a Vehicle," which claims the benefit of U.S. Provisional Patent Application No. 62/152,218, entitled "Path Controller Algorithms", which was filed on Apr. 24, 2015. All of the foregoing are incorporated by reference herein as though set forth in their entirety.

TECHNICAL FIELD

The present disclosure relates to an apparatus and methods for controlling autonomous vehicles. More specifically, the present disclosure relates to methods and controllers configured to control autonomous vehicles to follow paths that include arcs, straight lines, and clothoid segments.

BACKGROUND

Vehicles, such as automobiles, off-road vehicles, agricultural tractors, or self-propelled agricultural implements, may be used in a variety of tasks (e.g., to transport people or goods from one location to another, to tow agricultural implements, to harvest, plow, cultivate, spray, etc.). Traditionally, vehicles are manually operated by an operator. That is, the steering and speed of a vehicle are controlled by an operator driving the vehicle. Unfortunately, the operator may not drive the vehicle along an efficient path from one location to another location as compared to autonomously controlled vehicles.

Accordingly, the number of applications for automated ground vehicles has been rapidly increasing. Examples include autonomous mining trucks, tractors, military target vehicles, and durability testing of passenger vehicles.

It is convenient to construct desired paths out of tangentially connected circular arc and straight line segments for autonomous vehicles, which have been shown to be optimal in terms of path length. Unfortunately, such paths cannot actually be driven if the steering angle is produced by a servo system, which introduces a finite steering rate causing lag, and most autonomous vehicles typically include a steering system that is rate-limited and has a finite steering rate due to a servo steering system that has a maximum turning rate. Autonomous vehicles also typically include a minimum right turn radius and a minimum left turn radius.

Furthermore, it may be desirable to control a vehicle to drive more general paths than those consisting of straight line segments and simple circular arcs having a constant curvature. In particular, it may be desirable to track path segments whose curvatures vary along the segment length (e.g., clothoid segments). Clothoid curves have a continuous rate of curvature as a function of path length. A clothoid is a curve where the curvature varies linearly with curve length. Paths generated with these types of curves are "drivable" in that no instantaneous changes in curvature rate are required. A clothoid path may parameterized by six quantities including initial position, initial heading, initial curvature, rate of curvature (with respect to path length) and path length ($x_0$, $y_0$, $g_0$, $\kappa$, $\sigma$, $s$).

Current controllers are not suited to track general segments well, given their current design. These controllers may drive such paths under the assumption that transitions between segments are "unplanned" (e.g., the controller may simply switch to a new path segment at some time ahead of actually reaching the transition point). This rudimentary process is one way of dealing with assumptions of linear lag and a nonlinear rate-limited actuator. However, these controllers may experience path segment transitions as "disturbances" that the control system must continuously deal with, which may lead to degradation in controller performance. Moreover, these path controllers may use linear or nonlinear approaches to deal with these disturbances that do not result in linear dynamics in the off-path, normal error. Accordingly, previous controllers may not achieve optimal transitions between path segments.

SUMMARY

The various systems and methods of the present disclosure have been developed in response to the present state of the art, and in particular, in response to the problems and needs in the art that have not yet been fully solved by currently available technology. The present disclosure may provide a controller and method for achieving optimal transitions between path segments that minimize off-path normal error to better track desired path plans. The algorithms and controller described herein may be used with any system that controls a vehicle or object on a path. For example, the controller and methods described herein may be applied to autonomously controlled vehicles, remote controlled vehicles, or tele-operated vehicles. The algorithms disclosed herein may also be implemented in any programming language. Use of the algorithm and methods described herein may allow a vehicle to better follow paths when some of the path segments consist of clothoids and when steering is rate-limited and may also provide more meaningful tuning parameters for the path controller by making the off-path, normal error dynamics linear, and therefore easier to understand.

In some embodiments, a path controller for guiding an autonomous vehicle along a desired path may include an input module that may receive input signals such as, a normal error signal that indicates an off-path deviation of the autonomous vehicle relative to a desired path, a heading signal, and a curvature signal associated with the autonomous vehicle. The path controller may also include a curvature rate module that calculates a curvature rate output signal to guide the autonomous vehicle along the desired path and a communication module that communicates the curvature rate output signal to a steering control system.

In other embodiments, a method of controlling an autonomous vehicle may include receiving input signals such as, a normal error signal that indicates an off-path deviation of the autonomous vehicle relative to a desired path, a heading signal, and a curvature signal associated with the autonomous vehicle. The method may also include calculating a curvature rate output signal based on the input signals that may guide the autonomous vehicle along the desired path and communicating the curvature rate output signal to a steering control system associated with the autonomous vehicle.

In yet other embodiments, a computer program product for controlling an autonomous vehicle may include a nontransitory computer readable medium and computer program code, encoded on the nontransitory computer readable medium, configured to cause at least one processor to perform the steps of: receiving input signals such as, a normal error signal that indicates an off-path deviation of the autonomous vehicle relative to a desired path, a heading signal, and a curvature signal associated with the autonomous vehicle, as well as calculating a curvature rate output signal based on the input signals that may guide the autonomous vehicle along the desired path, and communicating the curvature rate output signal to a steering control system associated with the autonomous vehicle.

In alternative embodiments of the disclosure, other outputs could be used instead of the off-path normal error, other nonlinear methods could be used that do not involve feedback linearization, and/or other methods may be used to optimize the controller instead of the LQR method.

These and other features and advantages of the present disclosure will become more fully apparent from the following description and appended claims, or may be learned by the practice of the disclosure as set forth hereinafter.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the system and method, as represented in FIGS. 1 through 9B, is not intended to limit the scope of the present disclosure, as claimed in this or any other application claiming priority to this application, but is merely representative of exemplary embodiments of the present disclosure.

Disclosed herein are methods and controllers for commanding an autonomous vehicle to more accurately follow paths which consist of arc, line, and clothoid segments. The output of the controller may be a curvature rate, instead of a simple constant curvature, which may make it possible to better track paths with changing curvature values, such as clothoid segments. Adjustable parameters may also be provided to control tradeoffs between accuracy and smoothness when making transitions between path segments and the controller algorithms described herein may better handle steering rate limits associated with steering actuators than prior controllers. Controllers described herein may also use nonlinear feedforward to output linearize the system to produce straightforward, intuitive dynamic behavior (transients), as well as stabilize the system by applying the LQR methods to the controller. This may result in a controller that is easier to tune, due to the use of the LQR method with its use of weights on errors and reduced possibility for instability. Thus, in at least one embodiment, a controller and/or algorithm may combine a curvature rate output, output linearization with respect to normal error, and LQR to better track arc, line, and clothoid path segments with respect to off-path, normal error.

Figure 1:
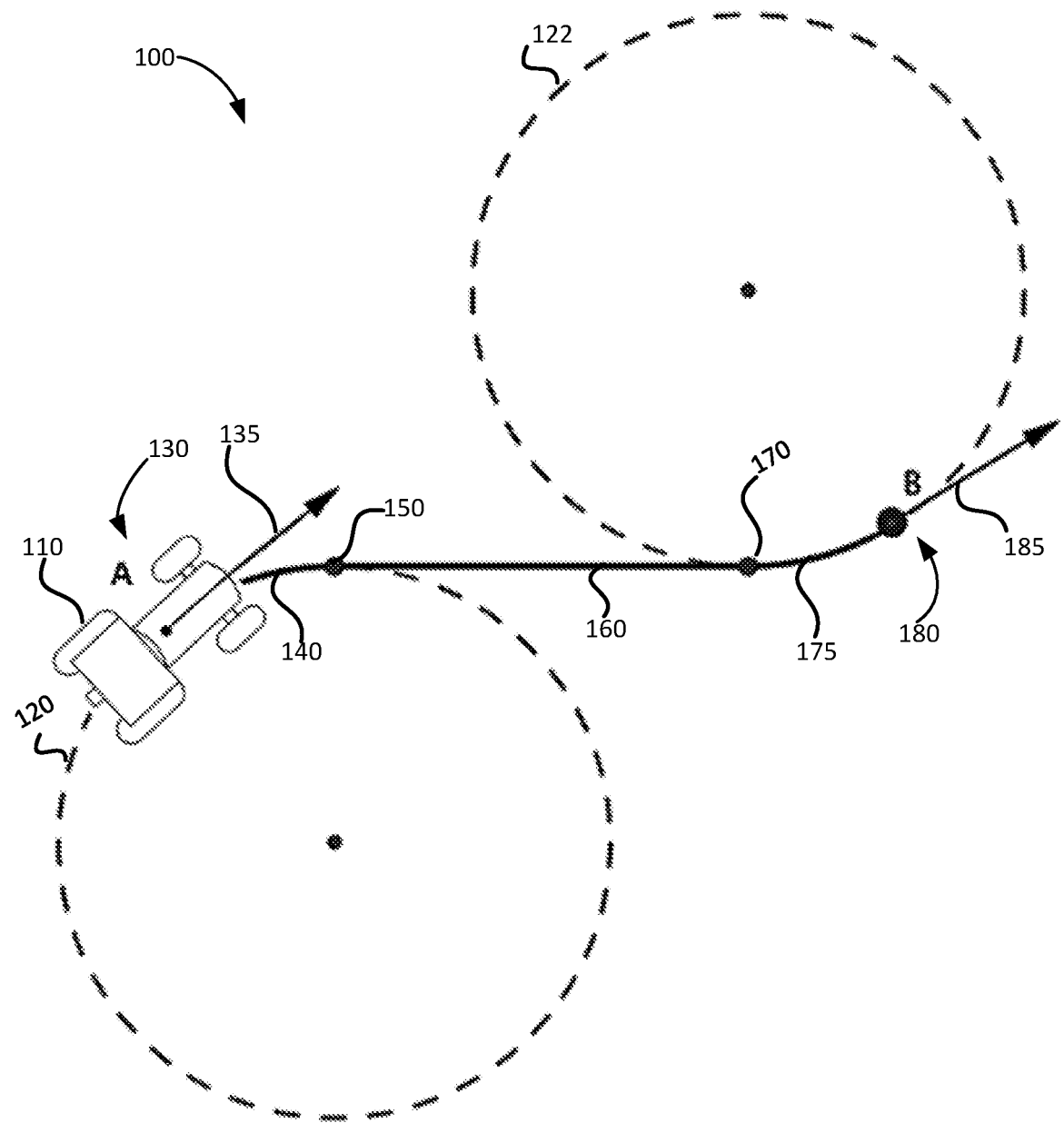
FIG. 1 illustrates a graphical top view of an autonomous vehicle executing a "right turn-straight line-left turn" Dubins path.
Figure 2:
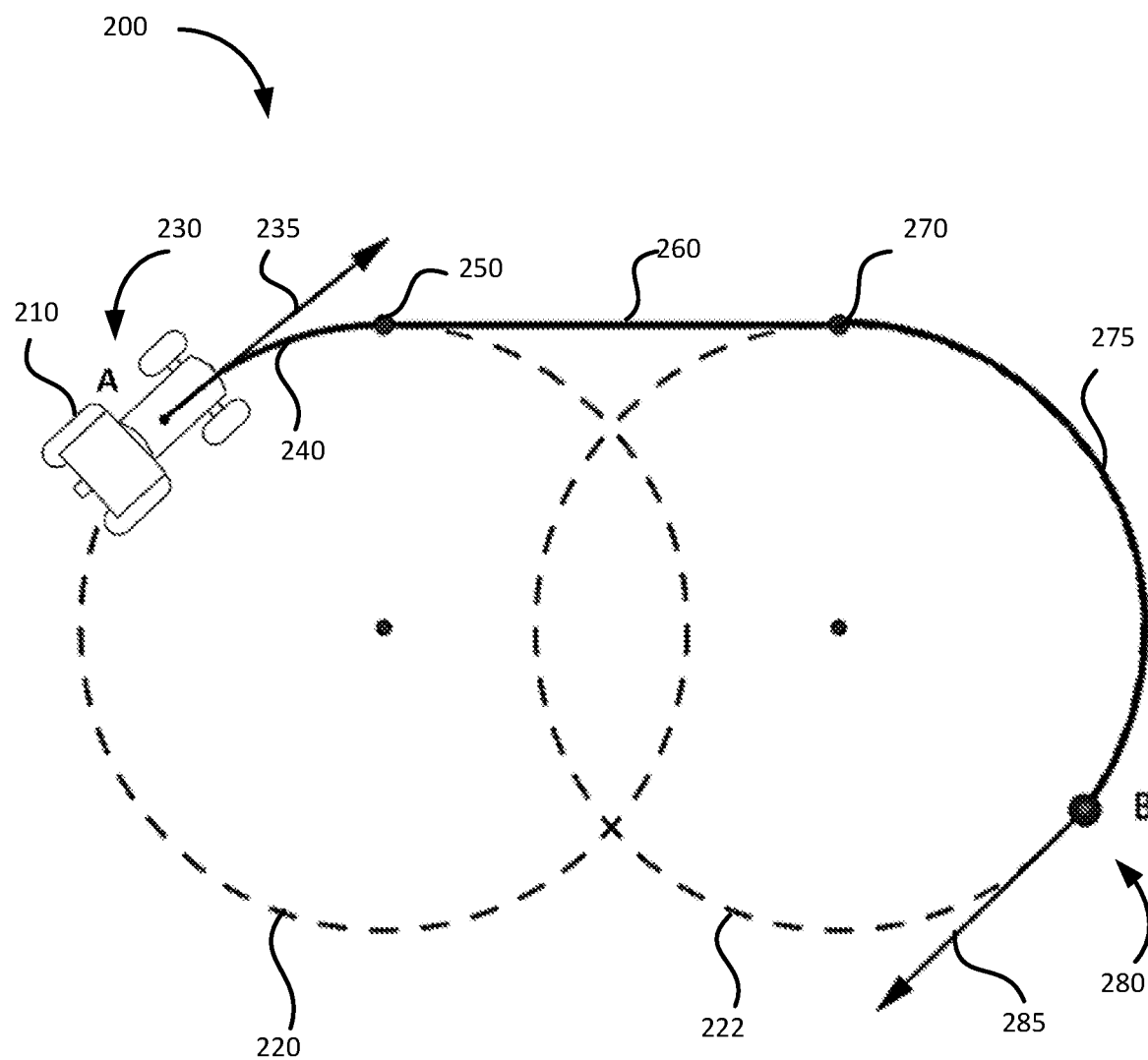
FIG. 2 illustrates a graphical top view of an autonomous vehicle executing a "right turn-straight line-right turn" Dubins path.
Figure 3:
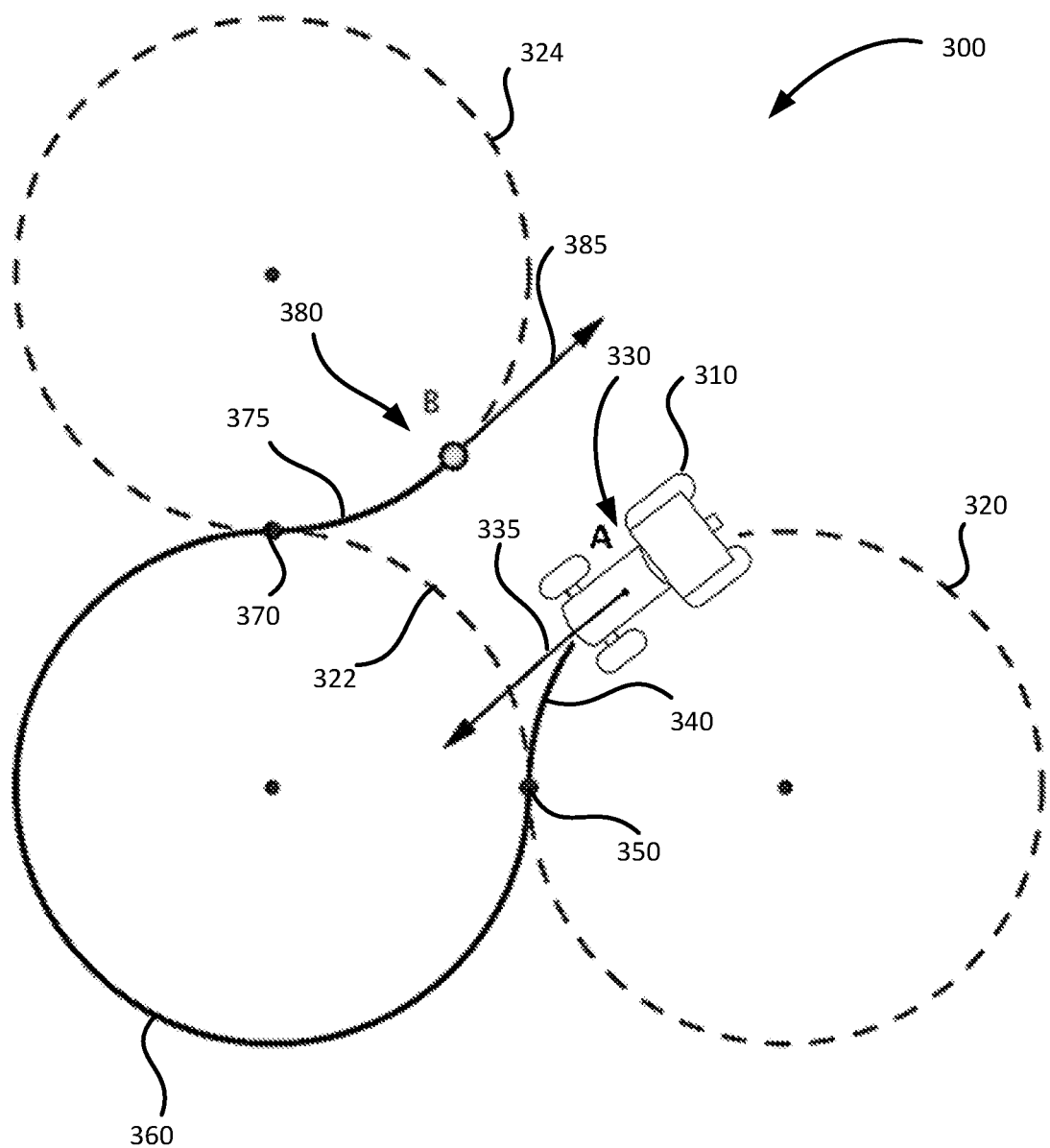
FIG. 3 illustrates a graphical top view of an autonomous vehicle executing a "left turn-straight line-left turn" Dubins path.

FIGS. 1-3 illustrate various graphical top views of an autonomous vehicle 110, 210, 310 executing different path plans made of simple circular arcs and straight lines, known as Dubins paths. In particular, FIG. 1 shows the autonomous vehicle 110 executing a "right turn-straight line-left turn" Dubins path; FIG. 2 shows the autonomous vehicle 210 executing a "right turn-straight line-right turn" Dubins path; and FIG. 3 shows the autonomous vehicle 310 executing a "left turn-straight line-left turn" Dubins path.

In geometry, a Dubins path typically refers to the shortest curve that connects two points in the two-dimensional Euclidean plane (e.g., the "x-y" plane) with a constraint on the curvature of the path and prescribed initial and terminal tangents to the path. A Dubins path typically consists of maximum curvature arcs and/or straight line segments to achieve the shortest feasible path between two destinations for an autonomous vehicle. The optimal path type can be described as a vehicle making a combination of 'right turns (R)', 'left turns (L)' or driving 'straight (S).' Thus, an optimal Dubins path will always be at least one of the following six types: RSR, RSL, LSR, LSL, RLR, and LRL. In this manner, given an initial position, an initial heading, a final position, and a final heading, an optimal path may be created to form a shortest path length between these two point using simple arcs and straight lines.

FIG. 1 illustrates an autonomous vehicle 110 executing an RSL Dubins path 100, corresponding to a first arc 140 (right turn) that lies on a first circle 120, followed by a straight line segment 160, followed by a second arc 175 (left turn) that lies on a second circle 122. The autonomous vehicle 110 may start at an initial point "A" 130 along the first arc 140 with an initial heading 135. At a first transition connection point 150, the autonomous vehicle 110 may transition to the straight line segment 160. At a second transition connection point 170, the autonomous vehicle 110 may transition to the second arc 175 and follow this arc until it reaches its final destination at a final point "B" 180 along the second arc 175 where it will have a final heading 185.

FIG. 2 illustrates an autonomous vehicle 210 executing an RSR Dubins path 200, corresponding to a first arc 240 (right turn) that lies on a first circle 220, followed by a straight line segment 260, followed by a second arc 275 (right turn) that lies on a second circle 222. The autonomous vehicle 210 may start at an initial point "A" 230 along the first arc 240 with an initial heading 235. At a first transition connection point 250, the autonomous vehicle 210 may transition to the straight line segment 260. At a second transition connection point 270, the autonomous vehicle 210 may transition to the second arc 275 and follow this arc until it reaches its final destination at a final point "B" 280 along the second arc 275 where it will have a final heading 285.

FIG. 3 illustrates an autonomous vehicle 310 executing an LRL Dubins path 300, corresponding to a first arc 340 (left turn) that lies on a first circle 320, followed by a second arc 360 (right turn) that lies on a second circle 322, followed by a third arc 375 (left turn) that lies on a third circle 324. The autonomous vehicle 310 may start at an initial point "A" 330 along the first arc 340 with an initial heading 335. At a first transition connection point 350, the autonomous vehicle 310 may transition to the second arc 360 and follow this arc until it reaches the second transition connection point 370. The autonomous vehicle 310 may then transition to the third arc 375 and follow this arc until it reaches its final destination at a final point "B" 380 along the third arc 375 where it will have a final heading 385.

Figure 4:
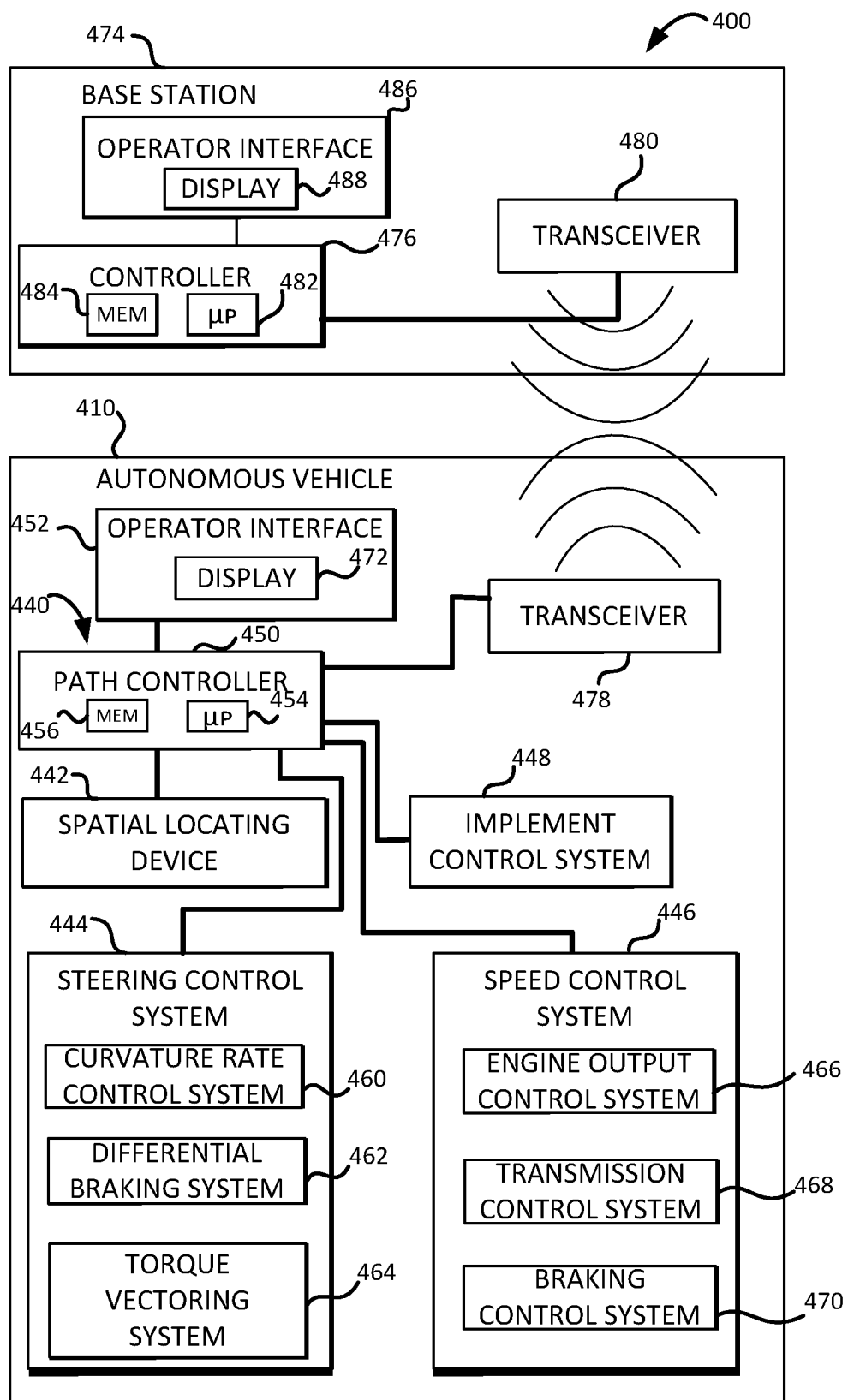
FIG. 4 illustrates a block diagram of an example autonomous vehicle communication and control system of the present disclosure.

FIG. 4 is a schematic diagram of an example communication and control system 400 that may be utilized in conjunction with the apparatus and methods of the present disclosure, in at least some embodiments. The communication and control system 400 may include a vehicle control system 440 which may be mounted on the autonomous vehicle 410. The autonomous vehicle 410 may also include a spatial locating device 442, which may be mounted to the autonomous vehicle 410 and configured to determine a position of the autonomous vehicle 410 as well as a heading and a speed of the autonomous vehicle 410. The spatial locating device 442 may include any suitable system configured to determine the position and/or other important characteristics of the autonomous vehicle 410, such as a global positioning system (GPS), a global navigation satellite system (GNSS), or the like. In certain embodiments, the spatial locating device 442 may be configured to determine the position and/or other characteristics of the autonomous vehicle 410 relative to a fixed point within a field (e.g., via a fixed radio transceiver). Accordingly, the spatial locating device 442 may be configured to determine the position of the autonomous vehicle 410 relative to a fixed global coordinate system using GPS, GNSS, a fixed local coordinate system, or any combination thereof.

The autonomous vehicle 410 may include a steering control system 444 configured to control a direction of movement of the autonomous vehicle 410, and a speed control system 446 configured to control a speed of the autonomous vehicle 410. In some embodiments, the autonomous vehicle 410 may include an implement control system 448 configured to control operation of an implement towed by the autonomous vehicle 410 or integrated within the autonomous vehicle 410. The control system 440 may further include a path controller 450 communicatively coupled to the spatial locating device 442, the steering control system 444, the speed control system 446, and the implement control system 448.

The path controller 450 may be configured to receive signals relative to many parameters of interest including, but not limited to: vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The path controller 450 may be an electronic controller with electrical circuitry configured to process data from the spatial locating device 442, among other components of the autonomous vehicle 410. The path controller 450 may include a processor, such as the illustrated microprocessor 454, and a memory device 456. The path controller 450 may also include one or more storage devices and/or other suitable components (not shown). The processor 454 may be used to execute software, such as software for calculating drivable path plans. Moreover, the processor 454 may include multiple microprocessors, one or more "general-purpose" microprocessors, one or more special-purpose microprocessors, and/or one or more application specific integrated circuits (ASICS), or any combination thereof. For example, the processor 454 may include one or more reduced instruction set (RISC) processors.

The memory device 456 may include a volatile memory, such as random access memory (RAM), and/or a nonvolatile memory, such as ROM. The memory device 456 may store a variety of information and may be used for various purposes. For example, the memory device 456 may store processor-executable instructions (e.g., firmware or software) for the processor 454 to execute, such as instructions for calculating drivable path plans, and/or controlling the autonomous vehicle 410. The memory device 456 may include flash memory, one or more hard drives, or any other suitable optical, magnetic, or solid-state storage medium, or a combination thereof. The memory device 456 may store data such as field maps, maps of desired paths, vehicle characteristics, software or firmware instructions, and/or any other suitable data.

The steering control system 444 may include a curvature rate control system 460, a differential braking system 462, and a torque vectoring system 464 that may be used to steer the autonomous vehicle 410. In at least one embodiment, the curvature rate control system 460 may control a direction of an autonomous vehicle 410 by actuating a servo controlled steering system associated with the autonomous vehicle 410 with a curvature rate signal, such as an Ackerman style autonomous vehicle 410. In other embodiments, the curvature rate control system 460 may automatically rotate one or more wheels or tracks of the autonomous vehicle 410 via hydraulic actuators to steer the autonomous vehicle 410. By way of example, the curvature rate control system 460 may rotate front wheels/tracks, rear wheels/tracks, and/or intermediate wheels/tracks of the autonomous vehicle 410, either individually or in groups. The differential braking system 462 may independently vary the braking force on each lateral side of the autonomous vehicle 410 to direct the autonomous vehicle 410. Similarly, the torque vectoring system 464 may differentially apply torque from the engine to the wheels and/or tracks on each lateral side of the autonomous vehicle 410. While the illustrated steering control system 444 includes the curvature rate control system 460, the differential braking system 462, and the torque vectoring system 464, it should be appreciated that alternative embodiments may include one or more of these systems, in any suitable combination. Further embodiments may include a steering control system 444 having other and/or additional systems to facilitate turning the autonomous vehicle 410 such as an articulated steering system, a differential drive system, and the like.

In the illustrated embodiment, the speed control system 446 may include an engine output control system 466, a transmission control system 468, and a braking control system 470. The engine output control system 466 may be configured to vary the output of the engine to control the speed of the autonomous vehicle 410. For example, the engine output control system 466 may vary a throttle setting of the engine, a fuel/air mixture of the engine, a timing of the engine, and/or other suitable engine parameters to control engine output. In addition, the transmission control system 468 may adjust gear selection within a transmission to control the speed of the autonomous vehicle 410. Furthermore, the braking control system 470 may adjust braking force to control the speed of the autonomous vehicle 410. While the illustrated speed control system 446 includes the engine output control system 466, the transmission control system 468, and the braking control system 470, it should be appreciated that alternative embodiments may include one or more of these systems, in any suitable combination. Further embodiments may include a speed control system 446 having other and/or additional systems to facilitate adjusting the speed of the autonomous vehicle 410.

For embodiments that may include an implement, the implement control system 448 may be configured to control various parameters of the implement towed by and/or integrated within the autonomous vehicle 410. For example, in certain embodiments, the implement control system 448 may be configured to instruct an implement controller via a communication link, such as a CAN bus or ISOBUS, to adjust a penetration depth of at least one ground engaging tool of an agricultural implement, which may reduce the draft load on the autonomous vehicle 410. Furthermore, the implement control system 448 may instruct the implement controller to transition the agricultural implement between a working position and a transport position, to adjust a flow rate of product from an agricultural implement, to adjust a position of a header of the agricultural implement (e.g., a harvester, etc.), among other operations.

The operator interface 452 may be communicatively coupled to the path controller 450 and configured to present data from the autonomous vehicle 410 via a display 472. Display data may include: data associated with operation of the autonomous vehicle 410, data associated with operation of an implement, a position of the autonomous vehicle 410, a speed of the autonomous vehicle 410, a desired path, a drivable path plan, a target position, a current position, etc. The operator interface 452 may be configured to enable an operator to control certain functions of the autonomous vehicle 410 such as starting and stopping the autonomous vehicle 410, inputting a desired path, etc. In some embodiments, the operator interface 452 may enable the operator to input parameters that cause the path controller 450 to adjust the drivable path plan. For example, the operator may provide an input requesting that the desired path be acquired as quickly as possible, that an off-path normal error be minimized, that a speed of the autonomous vehicle 410 remain within certain limits, that a lateral acceleration experienced by the autonomous vehicle 410 remain within certain limits, etc. In addition, the operator interface 452 may be configured to alert an operator if the desired path cannot be achieved (e.g., via the display 472, or via an audio system (not shown), etc., for example).

In certain embodiments, the control system 440 may include a base station 474 having a base station controller 476 located remotely from the autonomous vehicle 410. For example, in certain embodiments, control functions of the control system 440 may be distributed between the path controller 450 of the autonomous vehicle control system 440 and the base station controller 476. In certain embodiments, the base station controller 476 may perform a substantial portion of the control functions of the control system 440. For example, in certain embodiments, a first transceiver 478 positioned on the autonomous vehicle 410 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 480 at the base station 474. In these embodiments, the base station controller 476 may calculate drivable path plans and/or output control signals to control the curvature rate control system 444, the speed control system 446, and/or the implement control system 448 to direct the autonomous vehicle 410 toward the desired path, for example. The base station controller 476 may include a processor 482 and memory device 484 having similar features and/or capabilities as the processor 454 and the memory device 456 discussed previously. Likewise, the base station 474 may include an operator interface 486 having a display 488, which may have similar features and/or capabilities as the operator interface 452 and the display 472 discussed previously.

Before further discussing further the details of the present disclosure, we will first consider the theoretical background behind clothoid segments.

From a clothoid (or a Cornu Spiral, or a Euler Spiral) a planar parametric curve may be given by:

$$\begin{bmatrix} x(\tau) \\ y(\tau) \end{bmatrix} = \pi B \begin{bmatrix} C(\tau) \\ S(\tau) \end{bmatrix},$$

where:

$$C(\tau) = \int_0^\tau \cos\frac{\pi}{2}u^2 du,$$

$$S(\tau) = \int_0^\tau \cos\frac{\pi}{2}u^2 du,$$

and B is the magnitude of the clothoid. The magnitude of the clothoid spline B may correspond to a speed and a constant maximum curvature rate of a given autonomous vehicle. Thus, given a vehicle with curvature rate c and speed v, then:

$$B = \sqrt{\frac{v}{c\pi}}.$$

The tangent to a clothoid has the angle:

$$\frac{\pi\tau^2}{2},$$

while the curvature is:

$$\frac{\tau}{B}.$$

Figure 5:
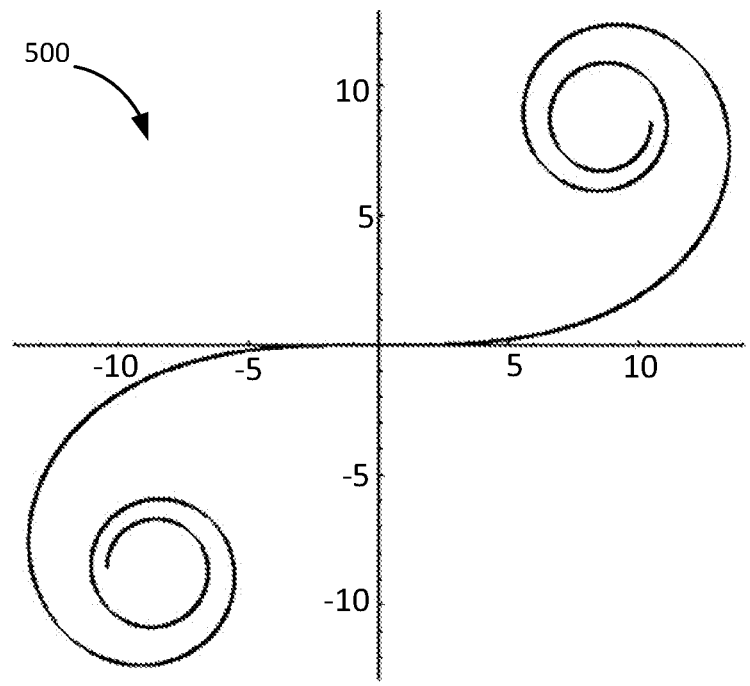
FIG. 5 is a graphical illustration of a clothoid function.

FIG. 5 is an example graphical illustration of a clothoid function having a magnitude of B=5.5.

Figure 6:
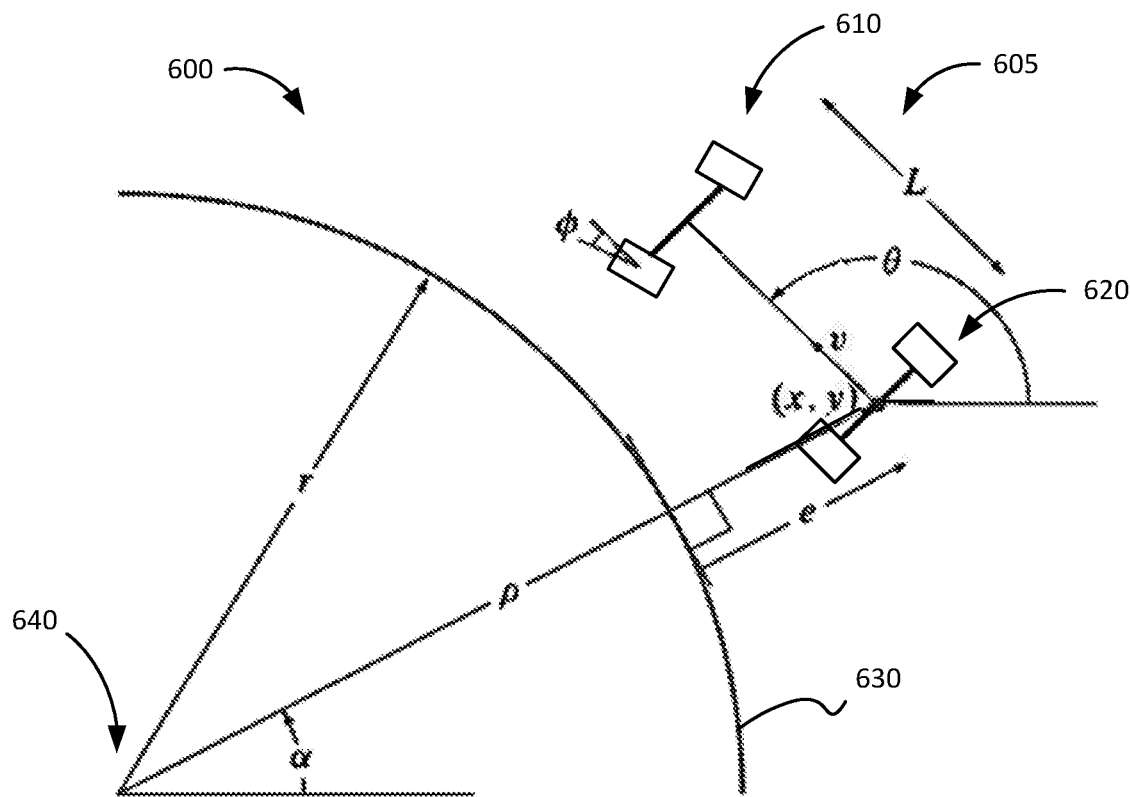
FIG. 6 is an illustration of a reference frame with notations that define normal error path tracking for an Ackerman style vehicle.

FIG. 6 illustrates a vehicle model and reference frame 600 with notations that generally define normal error path tracking for an Ackerman style vehicle 605 having a rear axle 620 and a front axle 610, as the Ackerman style vehicle 605 tracks off-path with respect to a desired circular arc path 630 having a center 640. The vehicle model shown in FIG. 6 may be simplified as a kinematic bicycle model, which gives:

$$\dot{x} = v\cos\theta,$$

$$\dot{y} = v\sin\theta,$$

$$\dot\theta = \frac{v}{L}\tan\phi = v\kappa, \text{ and}$$

$$\dot\kappa = u,$$

where (x, y) is the location of the midpoint of the rear axle, θ is the heading of the vehicle, v is the speed of the rear axle, L is the wheelbase, and φ is the angle of the steered front wheels. This is known as the "bicycle" model since the necessary differences in front wheel steering angles are ignored. Note that the above kinematic model of the vehicle includes a curvature state and the input to the model is the curvature rate. The following constraints imposed may be imposed: $\kappa \in [-\kappa_m, \kappa_m]$ and $u \in [-u_m, u_m]$, and the states may be expressed as $[x\ y\ \theta\ \kappa]^T$. In this embodiment, the curvature rate input may be defined as u. For some vehicles, the curvature rate u may be closely related to the steering rate of the vehicle. However, a slightly nonlinear relationship may exist between the curvature rate u and the steering rate of a given vehicle, due to the steering linkage geometry associated with the vehicle. For example, the steering linkage on a typical Ackerman vehicle may introduce a nonlinear relationship between the curvature rate and the steering rate of the vehicle.

Since the turning radius of the vehicle is:

$$\frac{L}{\tan\theta},$$

the last equation is often written in the alternate form, where the curvature, κ, is the reciprocal of the path radius. The curvature rate u may be constrained, due to the use of a steering actuator, in order to satisfy:

u∈[−c,c]

for some rate limit c>0.

Since the vehicle travels on circular arcs, it may also be convenient to use polar coordinates:

ρ=sin α

ρ=cos α.

In addition to the equations above, we may also use:

β=θ−α, to simplify these equations, resulting in:

$$\dot\rho = v\cos\beta,$$

$$\dot\beta = v\left(\kappa - \frac{\sin\beta}{\rho}\right),$$

$$\dot\alpha = v\frac{\sin\beta}{\rho}, \text{ and}$$

$$\dot\kappa = u.$$

A nice feature of this new set of coordinates is that since the control κ is generally only a function of ρ and β, the first two equations are independent of α and form a reduced system which can be analyzed more easily. For the tracking of circles, β gives the angle between the vehicle and the path, including an offset. So, for example, β=π/2 means the vehicle is parallel to the circular path and is pointed in the counter-clockwise direction. Similarly, β=−π/2 means the vehicle is parallel to the path and is pointed in the clockwise direction.

The normal error linearization technique will now be addressed for the case of simple line segments. Let a line segment be given by a point $(x_1, y_1)$, which may be anywhere on the line, as well as a vector (a,b), where $a^2+b^2=1$ and assume we are traveling forward. If the vehicle has position (x, y) and heading θ, then the normal error e and its first three derivatives can be derived as:

$$e = b(x-x_1) - a(y-y_1)$$

$$\dot e = v(b\cos\theta - a\sin\theta)$$

$$\ddot e = -v^2\kappa(b\sin\theta + a\cos\theta)$$

$$\dddot e = -v^2 u(b\sin\theta + a\cos\theta) - v^3\kappa^2(b\cos\theta - a\sin\theta)$$

Following the method of output linearization (the output in this case is e), we may choose:

$$u = -\frac{q + v^3\kappa^2(b\cos\theta - a\sin\theta)}{v^2(b\sin\theta + a\cos\theta)},$$

which produces the linear system $\dddot e = q$.

Letting $e_1 = e$, $e_2 = \dot e$, $e_3 = \ddot e$, we may write:

$$\frac{d}{dt}\begin{bmatrix}e_1\\e_2\\e_3\end{bmatrix} = \begin{bmatrix}0 & 1 & 0\\0 & 0 & 1\\0 & 0 & 0\end{bmatrix}\begin{bmatrix}e_1\\e_2\\e_3\end{bmatrix} + \begin{bmatrix}0\\0\\1\end{bmatrix} q. \qquad (1)$$

If we assume the feedback is linear, then:

$$q = -[k_1\ k_2\ k_3]\begin{bmatrix}e_1\\e_2\\e_3\end{bmatrix},$$

and we may then use the LQR method to choose the gains $k_1\ k_2\ k_3$.

The normal error linearization technique will now be addressed for the case of simple arc segments. Assume we are traveling forward, and we wish to track an arc in the counter-clockwise direction. The center of the arc is $(x_0, y_0)$, and its radius is r. Then, the normal error is given by:

$$e = \sqrt{(x-x_0)^2 + (y-y_0)^2} - r. \qquad (2)$$

If we let:

α=a tan 2(y−y₀,x−x₀), then the following are the first three derivatives of e:

$$\dot e = v\cos(\theta - \alpha)$$

$$\ddot e = -v^2(\kappa - \sin(\theta-\alpha))\sin(\theta-\alpha)$$

$$\dddot e = -v^3(\kappa - \sin(\theta-\alpha))\cos(\theta-\alpha)(u - v(\kappa - \sin(\theta-\alpha))\cos(\theta-\alpha))$$

Making the choice:

$$u = v(\kappa - \sin(\theta - \alpha))\cos(\theta - \alpha) - \frac{q}{v^3(\kappa - \sin(\theta - \alpha))\cos(\theta - \alpha)},$$

results in the same $\ddot{e} = q$ linear dynamics as in the line segment case and we can again use the LQR method to choose the feedback gains.

The normal error linearization technique will now be addressed for the case of clothoid segments. A rotated and translated clothoid with the usual orientation may be given by:

$$\begin{bmatrix} \cos\psi & -\sin\psi \\ \sin\psi & \cos\psi \end{bmatrix} \pi B \begin{bmatrix} C(\tau) \\ S(\tau) \end{bmatrix} + \begin{bmatrix} x_2 \\ y_2 \end{bmatrix},$$

where $C(\tau)$ and $S(\tau)$ are Fresnel integrals, $$C(\tau) = \int_0^\tau \cos\frac{\pi}{2}u^2 du$$

$$S(\tau) = \int_0^\tau \sin\frac{\pi}{2}u^2 du$$

B is the magnitude, $\psi$ is the rotation angle, and $(x_2, y_2)$ is the translation. For simplicity, we will assume that the vehicle point has been transformed so that instead of dealing with the clothoid above, we deal with the standard clothoid:

$$\pi B \begin{bmatrix} C(\tau) \\ S(\tau) \end{bmatrix}. \quad (3)$$

The first step in calculating the normal error to the clothoid is to determine the parameter $\tau$ where a line from the control point (x,y) to the clothoid is normal. This requires solving a single nonlinear equation in one unknown:

$$\left(\pi B \begin{bmatrix} C(\tau) \\ S(\tau) \end{bmatrix} - \begin{bmatrix} x \\ y \end{bmatrix}\right)^T \begin{bmatrix} \cos\frac{\pi}{2}\tau^2 \\ \sin\frac{\pi}{2}\tau^2 \end{bmatrix} = 0 \quad (4)$$

or $$(\pi BC(\tau) - x)\cos\frac{\pi}{2}\tau^2 + (\pi BS(\tau) - y)\sin\frac{\pi}{2}\tau^2 = 0$$

Since there isn't a closed-form solution, this has to be done numerically. The center of curvature of a clothoid is given by:

$$\begin{bmatrix} x_c \\ y_c \end{bmatrix} = \frac{\pi B}{\tau} \begin{bmatrix} C_I(\tau) \\ S_I(\tau) + \frac{1}{\pi} \end{bmatrix},$$

where $C_I(\tau)$ and $S_I(\tau)$ are the integrals of the Fresnel integrals:

$$C_I(\tau) = \int_0^\tau C(u)du = \tau C(\tau) - \frac{1}{\pi}\sin\frac{\pi}{2}\tau^2$$

$$S_I(\tau) = \int_0^\tau S(u)du = \tau S(\tau) + \frac{1}{\pi}\cos\frac{\pi}{2}\tau^2 - \frac{1}{\pi}$$

The normal error is then given by:

$$e = \sqrt{(x - x_c(\tau))^2 + (y - y_c(\tau))^2} - \sqrt{(\pi BC(\tau) - x_c(\tau))^2 + (\pi BS(\tau) - y_c(\tau))^2}.$$

The first term is the distance from the control point to the clothoid center of curvature. The second term is the distance from the clothoid point (of normalcy) to the clothoid center of curvature. This formula is analogous to the formula for the normal error for an arc segment in equation (2).

Similarly, we'll need equations for the first three derivatives of e. Since the formulas are likely to get very complicated, we will break the formulas up into parts. Let:

$$\varepsilon_1 = \sqrt{\chi_1^2 + \upsilon_1^2} \text{ and } \varepsilon_2 = \sqrt{\chi_2^2 + \upsilon_2^2},$$

and $e = \varepsilon_1 - \varepsilon_2$ with the obvious associations from formula (5).

Then, $$\dot{\tilde{q}} = \frac{\chi_i \dot{\chi}_i + \upsilon_i \dot{\upsilon}_i}{\sqrt{\chi_i^2 + \upsilon_i^2}},$$

$$\ddot{\tilde{q}} = \frac{\dot{\chi}_i^2 + \dot{\upsilon}_i^2 + \chi_i \ddot{\chi}_i + \upsilon_i \ddot{\upsilon}_i}{\sqrt{\chi_i^2 + \upsilon_i^2}} - \frac{(\chi_i \dot{\chi}_i + \upsilon_i \dot{\upsilon}_i)^2}{(\chi_i^2 + \upsilon_i^2)^{3/2}},$$

and $$\dddot{\tilde{q}} = \frac{3(\dot{\chi}_i \ddot{\chi}_i + \dot{\upsilon}_i \ddot{\upsilon}_i) + \chi_i \dddot{\chi}_i + \upsilon_i \dddot{\upsilon}_i}{\sqrt{\chi_i^2 + \upsilon_i^2}} - \frac{3(\dot{\chi}_i^2 + \dot{\upsilon}_i^2 + \chi_i \ddot{\chi}_i + \upsilon_i \ddot{\upsilon}_i)(\chi_i \dot{\chi}_i + \upsilon_i \dot{\upsilon}_i)}{(\chi_i^2 + \upsilon_i^2)^{3/2}} + \frac{3(\chi_i \dot{\chi}_i + \upsilon_i \dot{\upsilon}_i)^3}{(\chi_i^2 + \upsilon_i^2)^{5/2}}$$

Next, we have:

$$\chi_1 = x - \pi BC(\tau) + \frac{B}{\tau}\sin\frac{\pi}{2}\tau^2,$$

$$\dot{\chi}_1 = v\cos\theta - \frac{B\dot{\tau}\sin\frac{\pi}{2}\tau^2}{\tau^2}$$

$$\ddot{\chi}_1 = -v^2\kappa\sin\theta + \frac{B\dot{\tau}^2(2\sin\frac{\pi}{2}\tau^2 - \pi\tau^2\cos\frac{\pi}{2}\tau^2) - B\tau\ddot{\tau}\sin\frac{\pi}{2}\tau^2}{\tau^3},$$

and $$\dddot{\chi}_1 = -v^2 \dot{u}\sin\theta - v^3 \kappa^2 \cos\theta +$$

$$\frac{B\dot{\tau}^3(-6\sin\frac{\pi}{2}\tau^2 + 3\pi\tau^2\cos\frac{\pi}{2}\tau^2 + \pi^2\tau^4\sin\frac{\pi}{2}\tau^2) -}{\tau^4}$$

$$\frac{3B\tau\dot{\tau}\ddot{\tau}(-2\sin\frac{\pi}{2}\tau^2 + \pi\tau^2 + \pi\tau^2\cos\frac{\pi}{2}\tau^2) - B\tau^2\dddot{\tau}\sin\frac{\pi}{2}\tau^2}{\tau^4}.$$

Similarly, $$\upsilon_1 = y - \pi BS(\tau) - \frac{B}{\tau}\cos\frac{\pi}{2}\tau^2,$$

-continued $$\dot{v}_1 = v\sin\theta + \frac{B\dot{\tau}\cos\frac{\pi}{2}\tau^2}{\tau^2},$$

$$\ddot{v}_1 = v^2\kappa\cos\theta + \frac{-B\tau^2\left(2\cos\frac{\pi}{2}\tau^2 + \pi\tau^2\sin\frac{\pi}{2}\tau^2\right) + B\tau\ddot{\tau}\cos\frac{\pi}{2}\tau^2}{\tau^3},$$

and $$\dddot{v}_1 = v^2u\cos\theta - v^3\kappa^2\sin\theta + \frac{-B\dot{\tau}^3\left(-6\cos\frac{\pi}{2}\tau^2 - 3\pi\tau^2\sin\frac{\pi}{2}\tau^2 + \pi^2\tau^4\cos\frac{\pi}{2}\tau^2\right) - 3B\tau\dot{\tau}\ddot{\tau}\left(2\cos\frac{\pi}{2}\tau^2 + \pi\tau^2 + \sin\frac{\pi}{2}\tau^2\right) - B\tau^2\dddot{\tau}\cos\frac{\pi}{2}\tau^2}{\tau^4}$$

For the second term in we have:

$$\chi_2 = \frac{B\sin\frac{\pi}{2}\tau^2}{\tau},$$

$$\dot{\chi}_2 = B\dot{\tau}\left(\pi\cos\frac{\pi}{2}\tau^2 - \frac{\sin\frac{\pi}{2}\tau^2}{\tau^2}\right),$$

$$\ddot{\chi}_2 = -B\frac{\dot{\tau}^2\left(-2\sin\frac{\pi}{2}\tau^2 + \pi\tau^2\cos\frac{\pi}{2}\tau^2 + \pi^2\tau^4\sin\frac{\pi}{2}\tau^2\right) + \tau\ddot{\tau}\left(\sin\frac{\pi}{2}\tau^2 - \pi\tau^2\cos\frac{\pi}{2}\tau^2\right)}{\tau^3},$$

and $$\dddot{\chi}_2 = -B\frac{\dot{\tau}^3\left(6\sin\frac{\pi}{2}\tau^2 - 3\pi\tau^2\cos\frac{\pi}{2}\tau^3 + \pi^3\tau^6\cos\frac{\pi}{2}\tau^2\right) + 3\tau\dot{\tau}\ddot{\tau}\left(-2\sin\frac{\pi}{2}\tau^2 + \pi\tau^2\cos\frac{\pi}{2}\tau^2 + \pi^2\tau^4\sin\frac{\pi}{2}\tau^2\right) + \tau^2\dddot{\tau}\left(\sin\frac{\pi}{2}\tau^2 - \pi\tau^2\cos\frac{\pi}{2}\tau^2\right)}{\tau^4}.$$

Next, $$v_2 = -\frac{B\cos\frac{\pi}{2}\tau^2}{\tau},$$

$$\dot{v}_2 = B\dot{\tau}\left(\pi\sin\frac{\pi}{2}\tau^2 + \frac{\cos\frac{\pi}{2}\tau^2}{\tau^2}\right),$$

$$\ddot{v}_2 = B\frac{\dot{\tau}^2\left(-2\cos\frac{\pi}{2}\tau^2 - \pi\tau^2\sin\frac{\pi}{2}\tau^2 + \pi^2\tau^4\cos\frac{\pi}{2}\tau^2\right) + \tau\ddot{\tau}\left(\cos\frac{\pi}{2}\tau^2 + \pi\tau^2\sin\frac{\pi}{2}\tau^2\right)}{\tau^3},$$

and $$\dddot{v}_2 = B\frac{\dot{\tau}^3\left(6\cos\frac{\pi}{2}\tau^2 + 3\pi\tau^2\cos\frac{\pi}{2}\tau^2 - \pi^3\tau^6\sin\frac{\pi}{2}\tau^2\right) + 3\tau\dot{\tau}\ddot{\tau}\left(-2\cos\frac{\pi}{2}\tau^2 - \pi\tau^2\sin\frac{\pi}{2}\tau^2 + \pi^2\tau^4\sin\frac{\pi}{2}\tau^2\right) + \tau^2\dddot{\tau}\left(\sin\frac{\pi}{2}\tau^2 + \pi\tau^2\sin\frac{\pi}{2}\tau^2\right)}{\tau^4}.$$

As mentioned earlier. The value of τ can be found numerically from equation Error! Reference source not found. Once this has been done, equation Error! Reference source not found. may be differentiated to find $\dot{\tau}$:

$$\dot{\tau} = v\frac{\cos\left(\theta - \frac{\pi}{2}\tau^2\right)}{\pi\left(B + \tau\left(B\pi S(\tau)\cos\frac{\pi}{2}\tau^2 - B\pi C(\tau)\sin\frac{\pi}{2}\tau^2 + x\sin\frac{\pi}{2}\tau^2 - y\cos\frac{\pi}{2}\tau^2\right)\right)}$$

We can then differentiate this expression to find $\ddot{\tau}$:

$$\ddot{\tau} = \frac{v\begin{pmatrix}-\sin\left(\frac{\pi}{2}\tau^2 - \theta\right)\left(B + B\pi\tau S(\tau)\cos\frac{\pi}{2}\tau^2 - B\pi\tau C(\tau)\sin\frac{\pi}{2}\tau^2 + \tau x\sin\frac{\pi}{2}\tau^2 - \tau y\cos\frac{\pi}{2}\tau^2\right)(-v\kappa + \pi\tau\dot{\tau}) + \cos\left(\frac{\pi}{2}\tau^2 - \theta\right)\begin{pmatrix}-v\tau\sin\left(\frac{\pi}{2}\tau^2 - \theta\right) + \left(-B\pi S(\tau)\cos\frac{\pi}{2}\tau^2 + B\pi C(\tau)\sin\frac{\pi}{2}\tau^2 - x\sin\frac{\pi}{2}\tau^2 + y\cos\frac{\pi}{2}\tau^2\right)\dot{\tau} + \pi\tau^2\left(B\pi C(\tau)\cos\frac{\pi}{2}\tau^2 + B\pi S(\tau)\sin\frac{\pi}{2}\tau^2 - x\cos\frac{\pi}{2}\tau^2 - y\sin\frac{\pi}{2}\tau^2\right)\dot{\tau}\end{pmatrix}\end{pmatrix}}{\pi\left(B + B\pi\tau S(\tau)\cos\frac{\pi}{2}\tau^2 - B\pi\tau C(\tau)\sin\frac{\pi}{2}\tau^2 + \tau x\sin\frac{\pi}{2}\tau^2 - \tau y\cos\frac{\pi}{2}\tau^2\right)^2}.$$

We cannot immediately solve for $\ddot{\tau}$ by differentiating the above expression for $\dot{\tau}$ because the resulting expression for $\ddot{\tau}$ involves u, which is our unknown input. For this reason, we will have to solve two equations in two unknowns. The two unknowns appear linearly in the equations, so the solution is straightforward even though the coefficients are somewhat complicated. The two equations are $\dddot{e} = q$, where e is given by equation (5), and the other equation is the third derivative of equation (4).

Thus, the equations take the form $$\begin{bmatrix} a_{11} & a_{12} \\ a_{21} & a_{22} \end{bmatrix}\begin{bmatrix} u \\ \dddot{\tau} \end{bmatrix} = \begin{bmatrix} b_1 \\ b_2 \end{bmatrix}$$

with $$a_{11} = -v^2\sin\theta\frac{\chi_1}{\sqrt{\chi_1^2 + v_1^2}} + v^2\cos\theta\frac{v_1}{\sqrt{\chi_1^2 + v^2}},$$

$$a_{12} = -\frac{B\sin\frac{\pi}{2}\tau^2}{\tau^2}\frac{\chi_1}{\sqrt{\chi_1^2 + v_1^2}} + \frac{B\cos\frac{\pi}{2}\tau^2}{\tau^2}\frac{v_1}{\sqrt{\chi_1^2 + v^2}} + \frac{B\left(\sin\frac{\pi}{2}\tau^2 - \pi\tau^2\cos\frac{\pi}{2}\tau^2\right)}{\tau^2}\frac{\chi_2}{\sqrt{\chi_2^2 + v_2^2}} - \frac{B\left(\cos\frac{\pi}{2}\tau^2 + \pi\tau^2\sin\frac{\pi}{2}\tau^2\right)}{\tau^2}\frac{v_2}{\sqrt{\chi_2^2 + v_2^2}},$$

$$a_{21} = v^2\sin\left(\theta - \frac{\pi}{2}\tau^2\right),$$

$$a_{22} = \pi\left(B + B\pi\tau S(\tau)\cos\frac{\pi}{2}\tau^2 - B\pi\tau C(\tau)\sin\frac{\pi}{2}\tau^2 + x\tau\sin\frac{\pi}{2}\tau^2 - y\tau\cos\frac{\pi}{2}\tau^2\right),$$

$$b_1 = q - \frac{3(\dot{\chi}_1\ddot{\chi}_1 + \dot{v}_1\ddot{v}_1)}{\sqrt{\chi_1^2 + v_1^2}} + \frac{3(\dot{\chi}_1^2 + \dot{v}_1^2 + \chi_1\ddot{\chi}_1 + v_1\ddot{v}_1)(\chi_1\dot{\chi}_1 + v_1\dot{v}_1)}{(\chi_1^2 + v_1^2)^{3/2}} - \frac{3(\chi_1\dot{\chi}_1 + v_1\dot{v}_1)^3}{(\chi_1^2 + v_1^2)^{5/2}} - \frac{\chi_1}{\sqrt{\chi_1^2 + v_1^2}}$$

-continued $$\left( \begin{array}{c} Bt^3\left(-6\sin\frac{\pi}{2}\tau^2 + 3\pi\tau^2\cos\frac{\pi}{2}\tau^2 + \pi^2\tau^4\sin\frac{\pi}{2}\tau^2\right) - \\ \dfrac{3B\tau\dot{\tau}\left(-2\sin\frac{\pi}{2}\tau^2 + \pi\tau^2\cos\frac{\pi}{2}\tau^2\right)}{\tau^4} \end{array} \right) -$$

$$\dfrac{v_1}{\sqrt{\dot{x}_1^2 + v_1^2}}\left( -v^3\kappa^2\sin\theta + \dfrac{-Bt^3\left(\begin{array}{c}6\cos\frac{\pi}{2}\tau^2 - 3\pi\tau^2\sin\frac{\pi}{2}\tau^2 + \\ \pi^2\tau^4\cos\frac{\pi}{2}\tau^2\end{array}\right) - }{(\tau^4)} + \dfrac{3B\tau\dot{\tau}\left(2\cos\frac{\pi}{2}\tau^2 + \pi\tau^2\cos\frac{\pi}{2}\tau^2\right)}{(\tau^4)} \right) +$$

$$\dfrac{3(\dot{x}_2\ddot{x}_2 + \dot{v}_2\ddot{v}_2)}{(\dot{x}_2^2 + \dot{v}_2^2)} - $$

$$\dfrac{3(\dot{x}_2^2 + \dot{v}_2^2 + \chi_2\dot{x}_2 + v_2\dot{v}_2)(\chi_2\dot{x}_2 + v_2\dot{v}_2)}{(\dot{x}_2^2 + \dot{v}_2^2)^{3/2}} + $$

$$\dfrac{3(\chi_2\dot{x}_2 + v_2\dot{v}_2)^3}{(\dot{x}_2^2 + \dot{v}_2^2)^{5/2}} - \dfrac{\chi_2}{\sqrt{\dot{x}_2^2 + v_2^2}}$$

$$B\dfrac{\left( \begin{array}{c} t^3\left(6\sin\frac{\pi}{2}\tau^2 - 3\pi\tau^2\cos\frac{\pi}{2}\tau^2 + \pi^3\tau^6\cos\frac{\pi}{2}\tau^2\right) + \\ 3\tau\dot{\tau}\left(-2\sin\frac{\pi}{2}\tau^2 + \pi\tau^2\cos\frac{\pi}{2}\tau^2 + \pi^2\tau^4\sin\frac{\pi}{2}\tau^2\right) \end{array}\right)}{(\tau^4)} +$$

$$\dfrac{v_2}{\sqrt{\dot{x}_2^2 + v_2^2}}$$

$$B\dfrac{\left( \begin{array}{c} t^3\left(6\cos\frac{\pi}{2}\tau^2 + 3\pi\tau^2\sin\frac{\pi}{2}\tau^2 - \pi^3\tau^6\sin\frac{\pi}{2}\tau^2\right) + \\ 3\tau\dot{\tau}\left(-2\cos\frac{\pi}{2}\tau^2 - \pi\tau^2\sin\frac{\pi}{2}\tau^2 + \pi^2\tau^4\sin\frac{\pi}{2}\tau^2\right) \end{array}\right)}{(\tau^4)}$$

and $$b_2 = -v^3\kappa^2\cos\left(\theta - \frac{\pi}{2}\tau^2\right) + 3\pi v^2\kappa\tau\dot{\tau}\cos\left(\theta - \frac{\pi}{2}\tau^2\right) +$$

$$\pi\left( \begin{array}{c} -3v\dot{\tau}^2\left(-\sin\left(\theta - \frac{\pi}{2}\tau^2\right) + \pi\tau^2\cos\left(\theta - \frac{\pi}{2}\tau^2\right)\right) + \\ \pi\tau\dot{\tau}^3\left( \begin{array}{c} B\pi\tau + B\pi S(\tau)\left(3\sin\left(\frac{\pi}{2}\tau^2\right) + \pi\tau^2\cos\left(\frac{\pi}{2}\tau^2\right)\right) - \\ B\pi\tau C(\tau)\left(= 3\cos\left(\frac{\pi}{2}\tau^2\right) + \pi\tau^2\sin\left(\frac{\pi}{2}\tau^2\right)\right) - \\ 3x\cos\left(\frac{\pi}{2}\tau^2\right) + \pi\tau^2 x\sin\left(\frac{\pi}{2}\tau^2\right) - 3y\sin\left(\frac{\pi}{2}\tau^2\right) - \\ \pi\tau^2 y\cos\left(\frac{\pi}{2}\tau^2\right) \end{array} \right) + \\ 3v\tau\dot{\tau}\sin\left(\theta - \frac{\pi}{2}\tau^2\right) + 3\tau\dot{\tau}\left( \begin{array}{c} B\pi C(\tau)\left(\sin\left(\frac{\pi}{2}\tau^2\right) + \pi\tau^2\cos\left(\frac{\pi}{2}\tau^2\right)\right) + \\ B\pi S(\tau)\left(-\cos\left(\frac{\pi}{2}\tau^2\right) + \pi\tau^2\sin\left(\frac{\pi}{2}\tau^2\right)\right) - \\ x\sin\left(\frac{\pi}{2}\tau^2\right) - \pi\tau^2 x\cos\left(\frac{\pi}{2}\tau^2\right) + \\ y\cos\left(\frac{\pi}{2}\tau^2\right) - \pi\tau^2 y\sin\left(\frac{\pi}{2}\tau^2\right) \end{array} \right) \end{array} \right)$$

These choices will produce the dynamics $\ddot{e} = q$, as before, and, again, the LQR method can be used to choose the gains for $e$, $\dot{e}$, and $\ddot{e}$. In an alternative embodiment, the above clothoid derivation could be rewritten with the derivative of the normal error written as the speed times the sine of the heading error, which may result in simpler equations.

1. Transform the vehicle pose (x, y, θ) such that the clothoid tracking problem is in the standard clothoid frame, where the clothoid is given by equation (3).

2. Solve for τ in equation (4) and use this τ to find the normal error e in equation (5).

3. Note that $\dot{e} = \dot{q}_1 - \dot{q}_{1_c}$ and $\ddot{e} = \ddot{q}_1 - \ddot{q}_{1_c}$, and use the above formulas for $\dot{q}_1$, $\ddot{q}_1$, as well as those for $\dot{\tau}$ and $\ddot{\tau}$ the value of τ from equation (4) to find $\dot{e}$ and $\ddot{e}$.

4. Using the LQR method, find the gain vector $[k_1\ k_2\ k_3]$ for the system in (1) Using the feedback:

$$q = -[k_1\ k_2\ k_3] \begin{bmatrix} e \\ \dot{e} \\ \ddot{e} \end{bmatrix}$$

find the value of the transformed input q.

5. Using this value of q and equation (6) solve for the curvature rate input u, which is the desired output from the controller.

Figure 7:
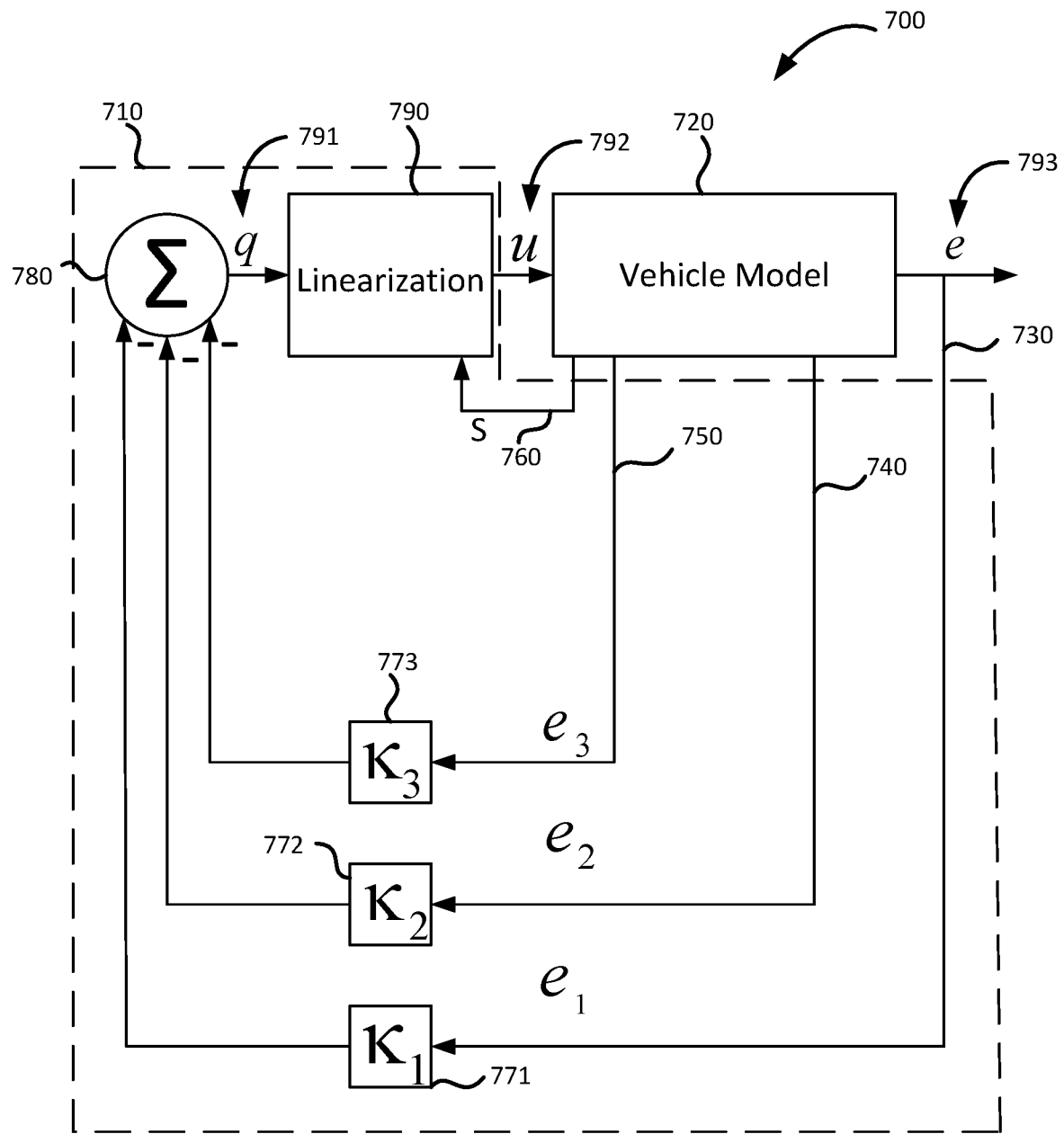
FIG. 7 illustrates a control loop flow diagram, according to one embodiment of the present disclosure.

FIG. 7 illustrates a control loop flow diagram 700 that may be used with embodiments of the present disclosure described above with respect to line segments, arc segments, and clothoid segments. The control loop flow diagram 700 shows how nonlinear feedforward may be used to output linearize the path controller to produce straightforward, intuitive dynamic behavior (transients), as well as stabilize the system by applying LQR methods. This may result in a path controller that is easier to tune, due to the use of the LQR method with its use of weights on errors and reduced possibility for instability. In this manner, the path controller may combine curvature rate output, output linearization with respect to normal error, and LQR to better track arc, line, and clothoid path segments with respect to off-path, normal error.

The control loop flow diagram 700 may include a path controller 710 (shown in dashed lines) communicatively coupled to a vehicle model block 720. The path controller 710 may include an integrator 780, a linearization block 790, and gain blocks 771, 772, 773 corresponding to gain values $k_1\ k_2\ k_3$. The path controller 710 may also include inputs 730, 740, and 750 that receive the off-path normal error signal "e" 793, as well as the first and second derivatives of the off-path normal error signal, $e_1=e$, $e_2=\dot{e}$, $e_3=\ddot{e}$, as can be seen in FIG. 7. The path controller 710 may also include one or more additional input signals, generally referred to as "S" 760, from other parts of the system, such as the vehicle model block 720. The input signals "S" 760, may include, but are not limited to: a heading signal, a curvature signal, a vehicle position signal, a vehicle speed signal, a curvature state signal, a vehicle state vector signal, a desired error signal (where the desired error signal indicates a desired off-path deviation of the autonomous vehicle relative to the desired path, where the desired path includes at least one of a straight line, an arc, and a clothoid segment), and the like.

The path controller 710 may produce a curvature rate output signal "u" 792 which may be used by a steering control system to control a curvature rate associated with a steering system of an autonomous vehicle. The curvature rate output signal 792 may be calculated based on the input signals received at the path controller 710 to linearize normal error dynamics in relation to the desired path by integrating the normal error signal received at the path controller 710 with one or more derivatives of the normal error signal. For example, the normal error signal 793 may be integrated together with its first and second derivatives by the integrator 780 to produce an output "q" 791 that may then be fed into the linearization block 790 to linearize the curvature rate output signal u 792. This linearization technique is similar for each path segment type (e.g., line, arc, or clothoid segment), but with different equations substituted for each path segment type in order to output linearize the curvature rate output signal u according to each path segment type.

As mentioned previously, the gain blocks 771, 772, 773 with corresponding gain values $k_1$ $k_2$ $k_3$, may be ascertained via an LQR process. In this manner, the curvature rate output signal u 792 may be calculated based on the input signals received at the path controller 710 and at least one gain value $k_1$ $k_2$ $k_3$ may be applied to feedback relating to the normal error signal 793 to stabilize the curvature rate output signal 792, where the at least one gain value is selected using a linear quadratic regulator process.

Figure 8:
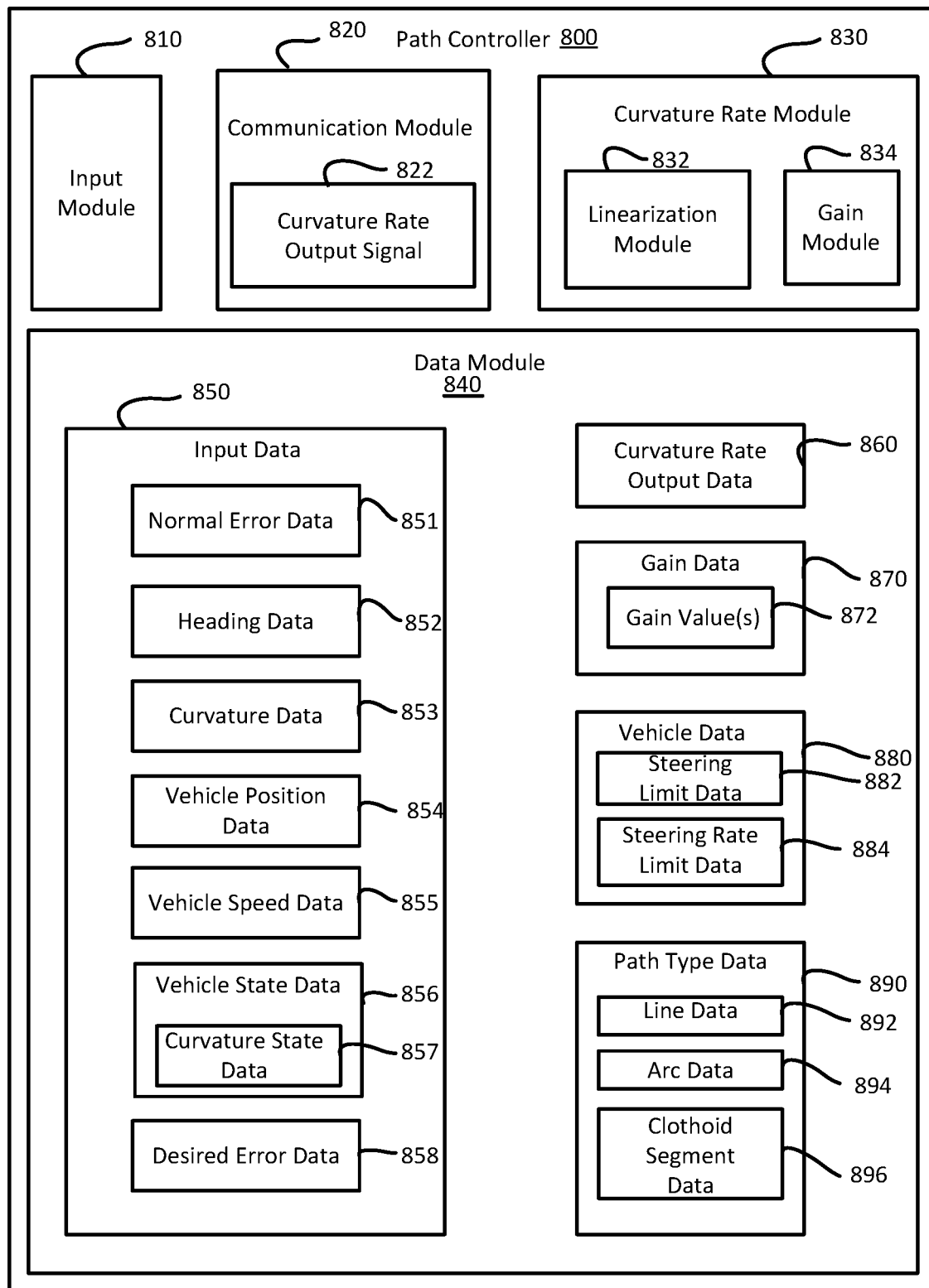
FIG. 8 illustrates a block diagram of a path controller, according to one embodiment of the present disclosure.

FIG. 8 illustrates a block diagram of a path controller 800 configured to guide an autonomous vehicle along a desired path, according to one embodiment of the present disclosure. The path controller 800 may include an input module 810, a curvature rate module 830, a communication module 820, and a data module 840.

The input module 810 may be configured to receive input signals at the path controller 800 such as: a normal error signal associated with the autonomous vehicle that indicates an off-path deviation of the autonomous vehicle relative to a desired path; a heading signal associated with the autonomous vehicle that indicates a current heading angle of the autonomous vehicle; and a curvature signal associated with the autonomous vehicle that indicates a curvature associated with a current turn radius of the autonomous vehicle. The input module 810 may also be configured to receive additional input signals, including, but not limited to: a heading signal, a vehicle position signal, a vehicle speed signal, a curvature state signal, a vehicle state vector signal, a desired error signal (where the desired error signal indicates a desired off-path deviation of the autonomous vehicle relative to the desired path), as well as other input signals. These input signals may be stored in the data module 840 as input data 850 including, but not limited to: normal error data 851, heading data 852, curvature data 853, vehicle position data 854, vehicle speed data 855, vehicle state data 856, curvature state data 857, desired error data 858, along with other data such as, vehicle data 880, steering limit data 882, steering rate limit data 884, path type data 890, line data 892, arc data, 894, clothoid segment data 896, gain data 870, gain value(s) 872, curvature rate output data 860, as well as other any other relevant data.

The curvature rate module 830 may be configured to calculate a curvature rate output signal 822 based on the input signals received at the path controller 800, and the curvature rate output signal 822 may be configured to guide the autonomous vehicle along a desired path. In at least one embodiment, the curvature rate module 830 may include a linearization module 832 and a gain module 834. The linearization module 832 may be configured to linearize normal error dynamics in relation to the desired path by integrating one or more derivatives of the normal error signal received at the path controller, as previously discussed. The gain module 834 may also be configured to apply at least one gain value 872 to feedback relating to the normal error signal to stabilize the curvature rate output signal 822, where the at least one gain value 872 is selected using a linear quadratic regulator process, as previously discussed.

The communication module 820 may be configured to communicate the curvature rate output signal 822 to a steering control system (not shown) that may be configured to receive the curvature rate output signal 822 and actuate a steering system (not shown) associated with the autonomous vehicle based on the curvature rate output signal 822 received from the path controller 800.

Figure 9A:
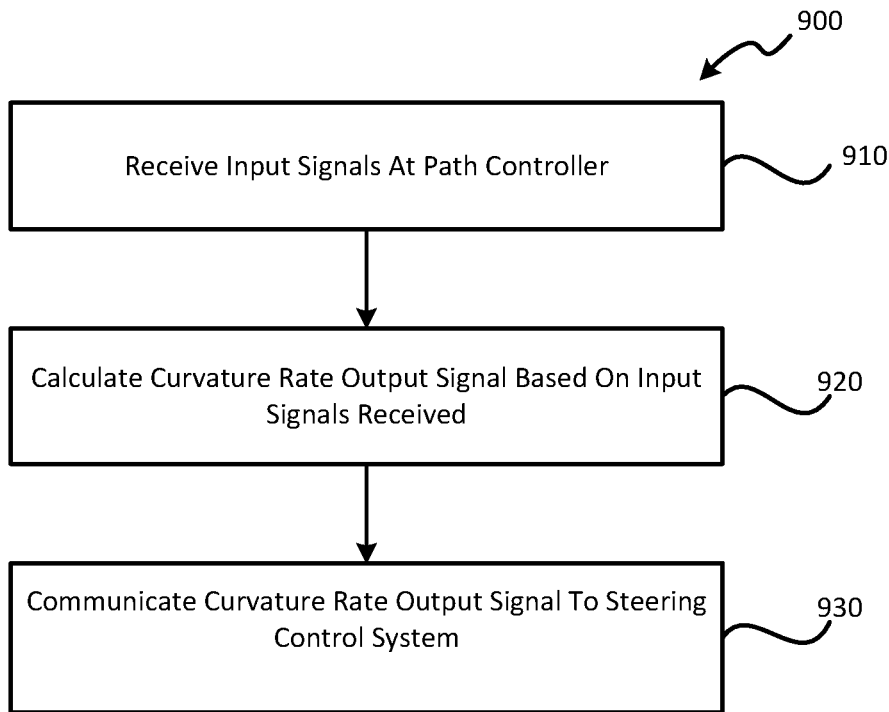
FIG. 9A illustrates a method of controlling a vehicle with a curvature rate output signal, according to one embodiment of the present disclosure.

FIG. 9A illustrates a flowchart of a method 900 by which a curvature rate output signal o may be used to control an autonomous vehicle along a desired path, according to one embodiment of the present disclosure. The method 900 may begin with a step 910 in which input signals may be received at the path controller such as, a normal error signal, a heading signal, and a curvature signal, as well as other input signals as previously discussed.

Once the input signals are received, the method 900 may proceed to a step 920 in which a curvature rate output signal may be calculated based on the input signals received at the path controller. The curvature rate output signal may be configured to guide the autonomous vehicle along the desired path.

Once the curvature rate output signal has been calculated, the method 900 may proceed to a step 930 in which the curvature rate output signal may be communicated to a steering control system that may be configured to receive the curvature rate output signal and actuate a steering system associated with the autonomous vehicle based on the curvature rate output signal received from the path controller, and the method 900 may end.

Figure 9B:
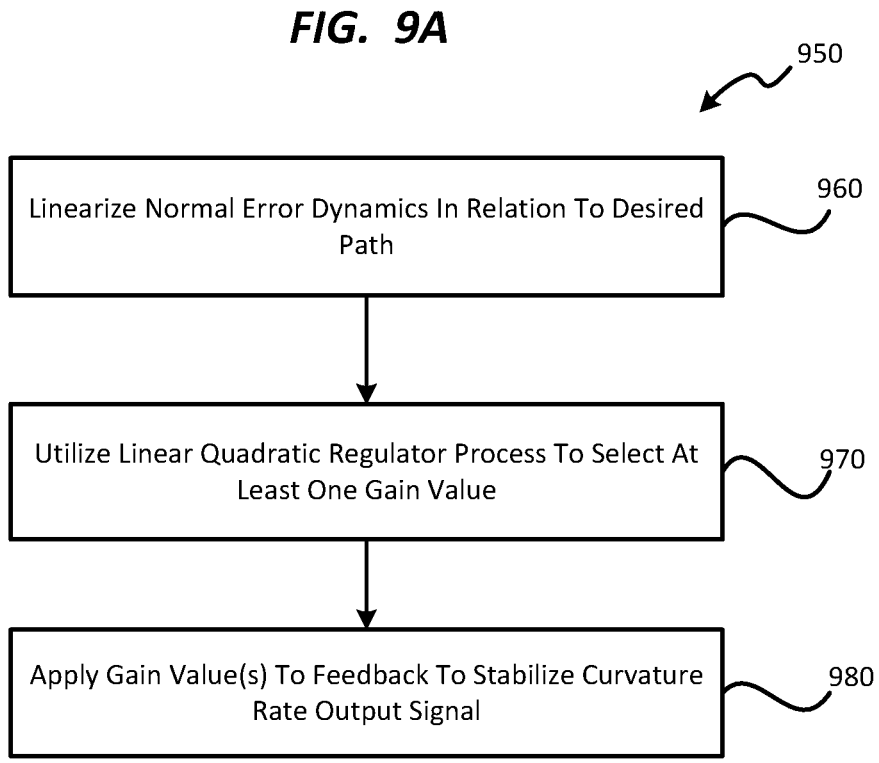
FIG. 9B illustrates a method of optimizing a path controller, according to embodiments of the present disclosure.

FIG. 9B illustrates a flowchart of a method 950 by which a path controller may be linearized and optimized, according to embodiments of the present disclosure. The method 950 may begin with a step 960 in which the normal error dynamics may be linearized in relation to the desired path by integrating one or more derivatives of the normal error signal received at the path controller, as previously discussed.

Once the normal error dynamics have been linearized, the method 950 may proceed to a step 970 in which a linear quadratic regulator process may be utilized to select at least one gain value to stabilize the curvature rate output signal.

Once the at least one gain value has been selected via the linear quadratic regulator process, the method 950 may proceed to a step 980 in which the selected at least one gain value may be applied to feedback relating to the normal error signal to stabilize the curvature rate output signal, and the method 950 may end.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it will be appreciated that in the above description of embodiments, various features are sometimes grouped together in a single embodiment, figure, or description for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Recitation in the claims of the term "first" with respect to a feature or element does not necessarily imply the existence of a second or additional such feature or element. Only elements recited in means-plus-function format are intended to be construed in accordance with 35 U.S.C. §112 Para. 6. It will be apparent to those having skill in the art that changes may be made to the details of the above-described embodiments without departing from the underlying principles of the disclosure.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure herein without departing from the spirit and scope of the disclosure.

What is claimed is:

1. A method of controlling an autonomous vehicle comprising:
  at a processor associated with a path controller configured to control an autonomous vehicle in order to guide the autonomous vehicle along a desired path:
    receiving at least one input signal indicative of a current position of the autonomous vehicle relative to at least one fixed point within a fixed coordinate system;
    calculating at least one output signal based on the at least one input signal received at the path controller by linearizing normal error dynamics in relation to the desired path by integrating one or more derivatives of a normal error signal, the at least one output signal guides the autonomous vehicle along the desired path, wherein at least one portion of the desired path comprises a clothoid segment having a continuously changing rate of curvature that varies linearly along the at least one portion of the desired path; and
    communicating the at least one output signal to a steering control system that receives the at least one output signal and actuates at least one actuator of a steering system associated with the autonomous vehicle to control a direction of movement of the autonomous vehicle based on the at least one output signal received from the path controller, wherein the at least one output signal guides the autonomous vehicle along the at least one portion of the desired path that comprises a clothoid segment having a continuously changing rate of curvature that varies linearly along the at least one portion of the desired path, and
  wherein the steering system associated with the autonomous vehicle comprises at least one of:
    an Ackerman steering system;
    a torque vectoring steering system;
    a selective wheel rotation steering system;
    a selective track rotation steering system;
    a differential braking steering system;
    a differential drive steering system; and
    an articulated steering system.

2. The method of claim 1, wherein the steering system associated with the autonomous vehicle is rate-limited and has a finite steering rate.

3. The method of claim 2, wherein the steering system associated with the autonomous vehicle has a minimum right turn radius and a minimum left turn radius.

4. The method of claim 1, wherein receiving at least one input signal comprises receiving at least one of: a vehicle position signal; a vehicle speed signal; a curvature state signal; a vehicle state vector signal; and a desired error signal, wherein the desired error signal indicates a desired off-path deviation of the autonomous vehicle relative to the desired path.

5. The method of claim 1, wherein the at least one portion of the desired path further comprises at least one of a straight line and an arc.

6. The method of claim 1, wherein calculating the at least one output signal based on the at least one input signal received at the path controller further comprises applying at least one gain value to feedback relating to the normal error signal to stabilize the at least one output signal, wherein the at least one gain value is selected using a linear quadratic regulator process.

7. A method of controlling an autonomous vehicle comprising:
  at a processor associated with a path controller configured to control an autonomous vehicle in order to guide the autonomous vehicle along a desired path:
    receiving at least one input signal indicative of a current position of the autonomous vehicle relative to at least one fixed point within a fixed coordinate system;
    receiving at least one input parameter configured to adjust the desired path to create an adjusted desired path based on the at least one input parameter, the at least one input parameter comprising at least one of:
      a request that the desired path be acquired as quickly as possible; a request that an off-path normal error be minimized;
      a request that a lateral acceleration experienced by the autonomous vehicle be maintained below a maximum lateral acceleration value; and
      a request for a desired off-path deviation of the autonomous vehicle relative to the desired path;
    calculating at least one output signal based on the at least one input signal and the at least one input parameter received at the path controller by linearizing normal error dynamics in relation to the desired path by integrating one or more derivatives of a normal error signal, the at least one output signal configured to guide the autonomous vehicle along the adjusted desired path, wherein at least one portion of the adjusted desired path comprises a clothoid segment having a continuously changing rate of curvature that varies linearly along the at least one portion of the desired path; and communicating the at least one output signal to a steering control system that is configured to receive the at least one output signal and actuate at least one actuator of a steering system associated with the autonomous vehicle to control a direction of movement of the autonomous vehicle based on the at least one output signal received from the path controller, wherein the at least one output signal is configured to guide the autonomous vehicle along the at least one portion of the adjusted desired path that comprises a clothoid segment having a continuously changing rate of curvature that varies linearly along the at least one portion of the adjusted desired path.

8. The method of claim 7, wherein the steering system associated with the autonomous vehicle is rate-limited and has a finite steering rate.

9. The method of claim 8 wherein the steering system associated with the autonomous vehicle has a minimum right turn radius and a minimum left turn radius.

10. The method of claim 7, wherein receiving at least one input signal comprises receiving at least one of: a vehicle position signal; a vehicle speed signal; a curvature state signal; a vehicle state vector signal; and a desired error signal, wherein the desired error signal indicates a desired off-path deviation of the autonomous vehicle relative to the desired path.

11. The method of claim 7, wherein the at least one portion of the adjusted desired path further comprises at least one of a straight line and an arc.

12. The method of claim 7, wherein calculating the at least one output signal based on the at least one input signal and the at least one input parameter received at the path controller further comprises applying at least one gain value to feedback relating to the normal error signal to stabilize the at least one output signal, wherein the at least one gain value is selected using a linear quadratic regulator process.

13. An autonomous vehicle control system configured to guide an autonomous vehicle along a desired path, the autonomous vehicle control system comprising:
a processor; and
a path controller in communication with the processor, the path controller configured to:
receive at least one input signal indicative of a current position of the autonomous vehicle relative to at least one fixed point within a fixed coordinate system;
calculate at least one output signal based on the at least one input signal received at the path controller by linearizing normal error dynamics in relation to the desired path by integrating one or more derivatives of a normal error signal, the at least one output signal configured to guide the autonomous vehicle along the desired path, wherein at least one portion of the desired path comprises a clothoid segment having a continuously changing rate of curvature that varies linearly along the at least one portion of the desired path; and
communicate the at least one output signal to a steering control system that is configured to receive the at least one output signal and actuate at least one actuator of a steering system associated with the autonomous vehicle to control a direction of movement of the autonomous vehicle based on the at least one output signal received from the path controller, wherein the at least one output signal is configured to guide the autonomous vehicle along the at least one portion of the desired path that comprises a clothoid segment having a continuously changing rate of curvature that varies linearly along the at least one portion of the desired path, and wherein the steering system associated with the autonomous vehicle comprises at least one of:
an Ackerman steering system;
a torque vectoring steering system; a selective wheel rotation steering system; a selective track rotation steering system;
a differential braking steering system;
a differential drive steering system; and
an articulated steering system.

14. The autonomous vehicle control system of claim 13, wherein the steering system associated with the autonomous vehicle is rate-limited and has a finite steering rate.

15. The autonomous vehicle control system of claim 14, wherein the steering system associated with the autonomous vehicle has a minimum right turn radius and a minimum left turn radius.

16. The autonomous vehicle control system of claim 13, wherein receiving at least one input signal comprises receiving at least one of: a vehicle position signal; a vehicle speed signal; a curvature state signal; a vehicle state vector signal; and a desired error signal, wherein the desired error signal indicates a desired off-path deviation of the autonomous vehicle relative to the desired path.

17. The autonomous vehicle control system of claim 13, wherein the at least one portion of the desired path further comprises at least one of a straight line and an arc.

* * * * *